United States Patent [19]

Hunt

[11] Patent Number: 4,668,135

[45] Date of Patent: May 26, 1987

[54] COOLANT SUPPLY IN ROTATING CUTTING TOOL

[75] Inventor: Carl E. Hunt, Milford, Mich.

[73] Assignee: GTE Valeron Corporation, Troy, Mich.

[21] Appl. No.: 723,653

[22] Filed: Apr. 16, 1985

[51] Int. Cl.⁴ .................. B23B 27/10; B23B 51/06; B23C 5/28; B23Q 11/10

[52] U.S. Cl. .................. 409/136; 137/849; 408/56; 408/59

[58] Field of Search .......... 408/56, 57, 59, 58, 408/61; 409/135, 136; 279/20; 137/849

[56] References Cited

U.S. PATENT DOCUMENTS

| | | | |
|---|---|---|---|
| 2,335,832 | 11/1943 | Williams | 137/849 X |
| 3,245,428 | 4/1966 | Klimak et al. | 137/849 X |
| 3,370,659 | 2/1968 | Gatien | 137/849 X |
| 3,689,168 | 9/1972 | Persson | 408/61 |
| 4,392,761 | 7/1983 | Eckle | 408/59 |
| 4,578,003 | 3/1986 | Eckle | 408/56 |

Primary Examiner—Gil Weidenfeld
Assistant Examiner—Steven C. Bishop
Attorney, Agent, or Firm—Witherspoon & Hargest

[57] ABSTRACT

A coolant supply apparatus, and cutting tool incorporating such apparatus, wherein during a cutting operation coolant is supplied from a coolant supply means through a coolant supply member which is spaced from a tool shank mounted supply ring. A valve is included for preventing leakage at the space between the coolant supply means and the supply ring when the coolant is being supplied.

21 Claims, 5 Drawing Figures

COOLANT SUPPLY IN ROTATING CUTTING TOOL

BACKGROUND OF THE INVENTION

1. Field of the Invention

The present invention is related to a coolant supply apparatus for a cutting tool for cutting a workpiece wherein there is relative cutting motion about an axis of rotation between a cutting member or plate mounted upon a tool shank and a workpiece. The coolant is supplied from a coolant supply means to the cutting member by means of aligned bores in a coolant supply member, coolant supply ring and tool shank.

The present invention is also related to a cutting tool including such a coolant supply apparatus and a flexible valve for use with such apparatus.

2. Description of the Prior Art

Presently, it is known to supply a cooling medium to a rotating cutting tool from a coolant supply means to a cutting member. For example, one known apparatus is described in U.S. Pat. No. 4,392,761 to Eckle. The rotary machinery tool described in the Eckle patent includes a coolant delivery system wherein coolant is supplied from a supply pipe through a series of bores to the cutting plates. The coolant is supplied during the cutting operation. The Eckle apparatus is particularly useful in those applications where the cutting tool performs a number of machining operations one after the other upon the same workpiece. In such operations, different cutting plates are used for different cutting operations on the same workpiece. It is highly desirable to automatically interchange the cutting plates throughout the process. Ordinarily it is necessary to disconnect and then reconnect the coolant supply system each time the cutting plates are changed. An object of the Eckle apparatus is to provide a system of the type described therein which provides automatic coupling of the coolant delivery apparatus during the cutting plate interchanging process. This is done by supplying a cooling medium to the cutting plates using a supply ring which is automatically connected to and disconnected from a coupling head during cutting plate changes. More particularly, when one cutting member has been replaced by another and the tool shank is caused to rotate, the supply ring is designed to rotate in the same direction by the friction between the tool shank and the supply ring which is positioned on the tool shank. In this manner, a sealing surface of a coupling piece radially projecting from the supply ring comes into engagement with a sealing surface of a coupling head so that coolant can pass through bores in the coupling head, coupling piece and supply ring and then on through a bore in the tool shank to the cutting member. However, this apparatus requires that the sealing surfaces be disposed at specifically identified acute angles to assure proper bore alignment and minimize leakage. In addition, the sealing surfaces must be forced or snapped into sealing engagement with each other by the rotation of the tool shank. Since the supply ring rotates as a result of friction between the tool shank and the supply ring, if the sealing surfaces are not properly oriented relative to each other prior to rotation, improper engagement of one of the surfaces by the other will result thereby preventing complete rotation of the ring causing incomplete alignment and undesirable leakage.

It is highly desirable to provide a coolant supply apparatus for a cutting tool which provides automatic coupling and uncoupling of the coolant delivery apparatus during the cutting plate interchanging process which does not require the engagement of specially oriented sealing surfaces to assure proper bore alignment and to minimize leakage. It is also desirable to provide such machinery wherein there is no need to force or snap together the sealing surfaces of a coupling piece and a coupling head in response to rotation of the tool shank.

SUMMARY OF THE INVENTION

This invention achieves these and other results by providing a coolant supply apparatus for a cutting tool for cutting a workpiece wherein there is relative cutting motion about an axis of rotation between a cutting member or plate mounted upon a tool shank having a tool bore and a workpiece and wherein coolant is supplied from a coolant supply means through a ring bore defined by a ring bore wall which extends from an outer peripheral surface, to an inner peripheral surface, of a coolant supply ring rotatably mounted upon the tool shank and through the tool bore to the cutting member. A coolant supply member is provided for coupling to the cutting tool. The coolant supply member has a supply inlet for coupling to the coolant supply means, a supply outlet, and a supply bore defined by a supply bore wall extending from the supply inlet to the supply outlet. The supply outlet is spaced from the peripheral surface of the ring when the coolant supply member is coupled to the cutting tool.

A valve means is provided coupled to the supply member adjacent the supply outlet for substantially preventing leakage between the supply bore and the ring bore when the supply member is coupled to the cutting tool and the supply and ring bores are aligned and coolant is being supplied by the coolant supply means. The valve means is flexible so that it is caused to extend towards the outer peripheral surface of the ring and engage the ring bore wall when the supply member is coupled to the cutting tool and the ring is rotated to align the ring bore with the supply bore and coolant is supplied by the coolant supply means. The valve means is disengaged from the ring bore wall and retracted from the outer peripheral surface of the ring when the coolant is not being supplied by the coolant supply means.

DESCRIPTION OF THE PREFERRED EMBODIMENT

Figure 1:
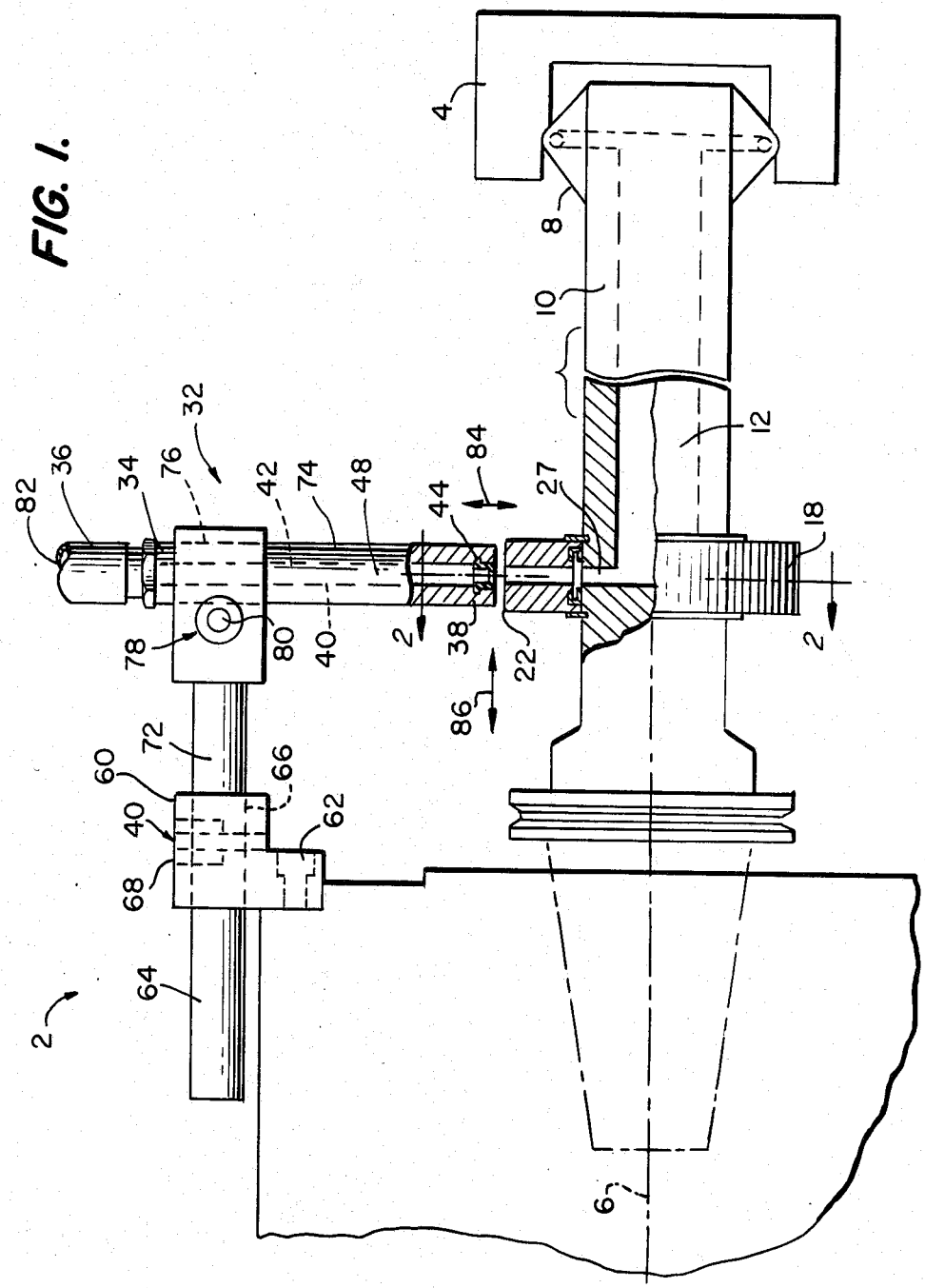
FIG. 1 is a side view partially in cross section of one embodiment of a cutting tool and coolant supply apparatus of the present invention.
Figure 2:
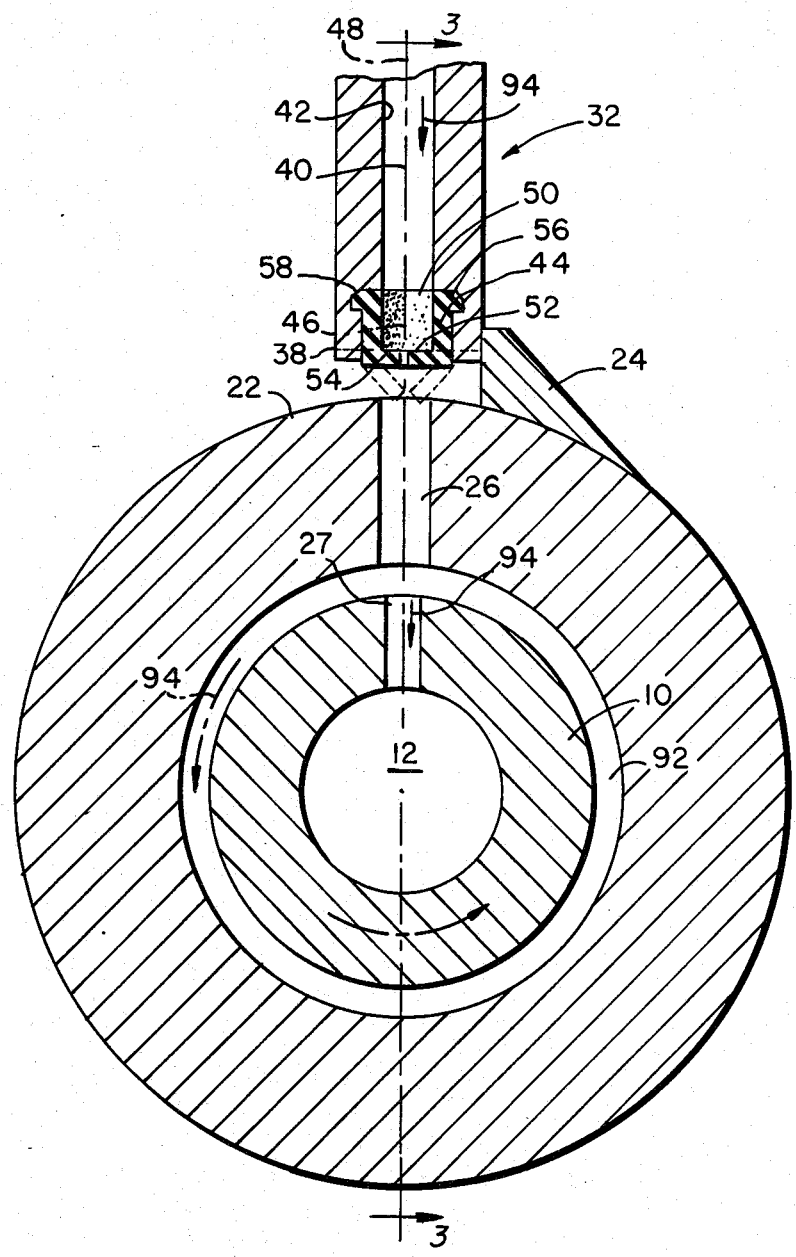
FIG. 2 is partial end view of the apparatus depicted in FIG. 1.
Figure 3:
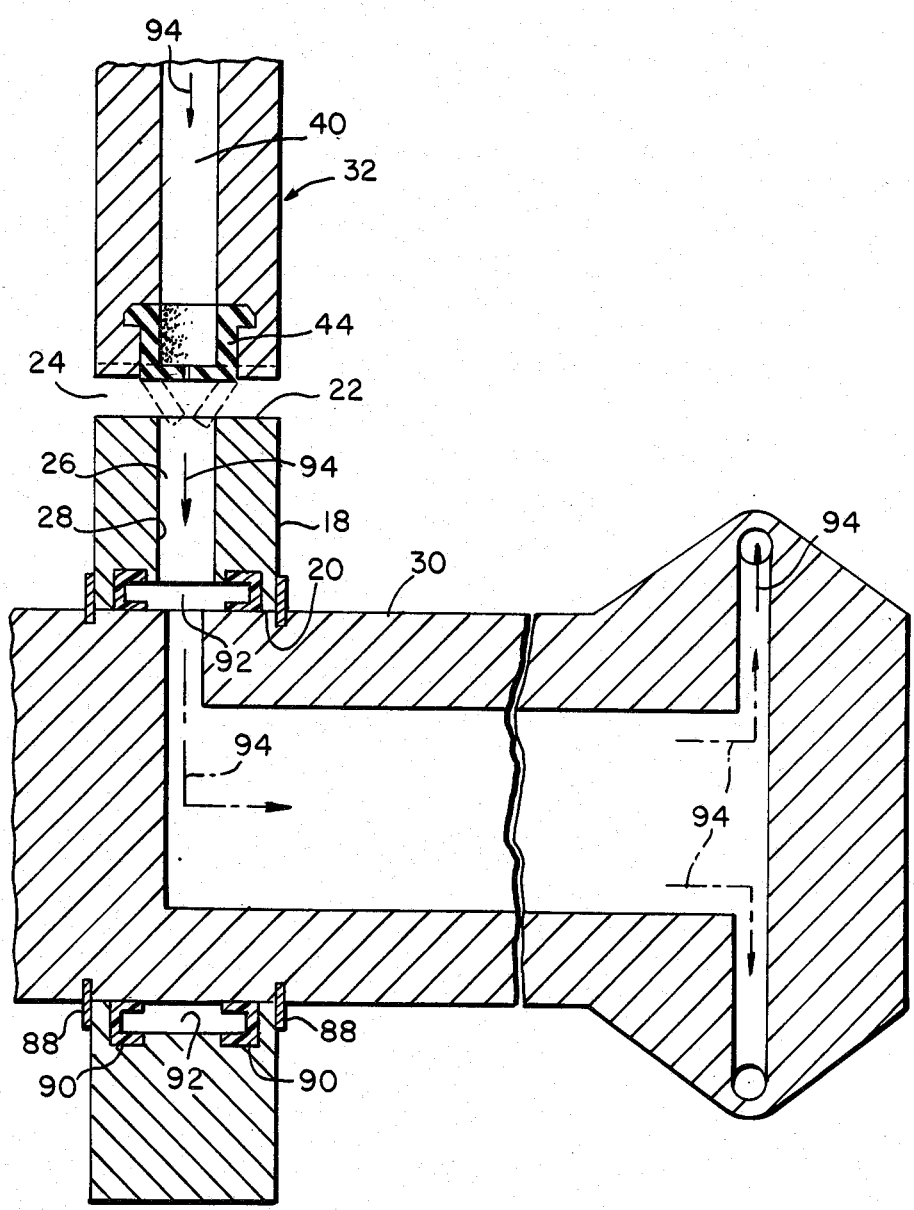
FIG. 3 is a view taken along line 3—3 of FIG. 2.

The embodiment of this invention which is illustrated in the drawings is particularly suited for achieving the objects of this invention. FIG. 1 depicts a machine or cutting tool 2 for cutting a workpiece 4 wherein there is relative cutting motion about an axis of rotation 6 between a cutting member 8 mounted upon a tool shank 10 having a tool bore 12 and workpiece 4. Such a cutting tool is of the type described in U.S. Pat. No. 4,392,761. In the embodiment depicted in FIG. 1, tool shank 10 having cutting members 8 attached thereto is caused to rotate about axis 6 in a manner known in the art. For example, tool shank 10 can be caused to rotate in a known manner by a motor which is not shown. A coolant inducer in the form of a coolant supply ring 18 is rotatably mounted upon tool shank 10. Referring to FIGS. 2 and 3, the ring 18 includes an inner peripheral surface 20 and an outer peripheral surface 22 having an inlet connector 24 extending therefrom. In order to simplify the drawings, the inlet connector 24 is only shown in FIGS. 2 and 3. Ring 18 includes a coolant supply ring bore 26 defined by a ring bore wall 28 which extends from inner surface 20 to outer surface 22. The relationship between ring 18 and tool shank 10 is such that when the shank is caused to rotate the supply ring will be caused to rotate in the same direction as a result of friction between the outer surface 30 of shank 10 and the surface 20 of ring 18. However, continued rotation of the ring 18 is terminated when the ring is rotated to the extent that inlet connector 24 engages the stationary coolant supply member 32 described in greater detail hereinafter.

Coolant supply member 32, which is coupled to the cutting tool 2, includes a supply inlet 34 coupled to a coolant supply means including hose 36 in a known manner. Supply member 32 also includes a supply outlet 38 and a supply bore 40 defined by a supply bore wall 42 which extends from the supply inlet 34 to the supply outlet 38. Supply outlet 38 is spaced from the peripheral surface 22 of ring 18 so that ring 18 is free to rotate without incurring friction which would otherwise be incurred if surface 22 was in contact with outlet 38.

In the apparatus thus far described, tool shank 10 and ring 18 coupled thereto are rotated until inlet connector 24 engages supply outlet 38 at which point the tool shank will continue to rotate so that the cutting members 8 rotate to cut the workpiece 4, and the ring will come to rest. Connector 24 and outlet 38 are constructed so that at such rest position ring bore 26 will be aligned with supply bore 40. When bores 26 and 40 are so aligned, coolant is supplied from the coolant supply means at hose 36 and passes through supply bore 40, ring bore 26, one or more radial bores 27 in the tool shank 10, and tool shank bore 12 to the cutting members 8.

A valve means is coupled to the supply member 32 adjacent the supply outlet 38 for substantially preventing leakage between the supply bore 40 and the ring bore 26 when the bores 40 and 26 are aligned and coolant is being supplied by the coolant supply means. For example, in the embodiment depicted in the drawings, a generally cup shaped valve member 44 is attached to the supply member 32. Valve member 44 includes an axis 46 extending in a longitudinal direction and coinciding with the supply axis 48 of supply member 32. The valve member 44 includes an open end 50 upstream of the supply bore 40 and an end 52 downstream of the supply bore. The end 52 of the valve member 44 is normally in a closed position as shown is solid lines in FIGS. 2 and 3. The normally closed end 52 includes at least one flexible closure 54 which relative to axis 46 normally extends radially as shown in FIGS. 2 and 3. The flexible closure 54 can be flexed to extend axially into ring bore 26 so as to engage the ring bore wall 28, as shown in phantom lines in FIGS. 2 and 3, when the supply bore 40 and ring bore 26 are in axial alignment and coolant is being supplied by the coolant supply means.

Figure 4:
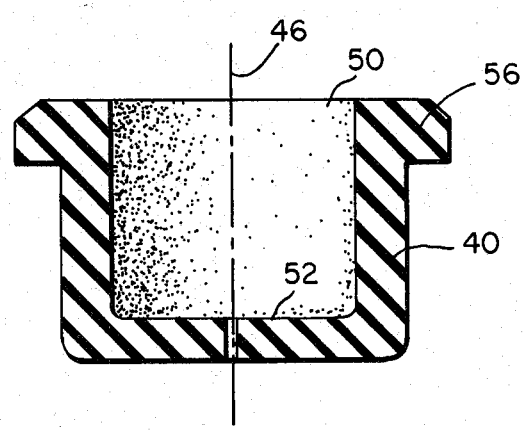
FIG. 4 is a cross sectional front view of a valve member of one embodiment of the present invention; and, FIG. 5 is a top view of the valve member of FIG. 4.
Figure 5:
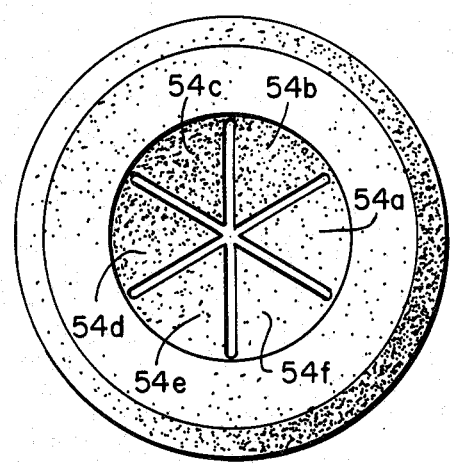

In the preferred embodiment the flexible closure comprises a plurality of flexible sections. For example, FIGS. 4 and 5 depict six such sections 54a, 54b, 54c, 54d, 54e and 54f, each of such sections preferably being wedge shaped as shown in the drawings. Preferably, the valve member comprises a flexible material. An example of such a material is, without limitation, neoprene.

The cup shaped member is mounted to the supply member 32 by means of a mounting flange. In particular, the cup shaped valve member 44 includes a flange 56 located adjacent the open end 50. Flange 56 extends radially outward relative to the axis 46 and into a groove 58 which extends circumferentially about supply bore wall 42 located adjacent the supply outlet 38.

The valve member of the type thus far discussed provides, without limitation, one form of valve means, the valve means being flexible as described so that the valve means is caused to extend towards the outer peripheral surface 22 of the ring 18 and engage the ring bore wall 28 when the ring 18 is rotated to align the ring bore 26 with the supply bore 40 and coolant is supplied by the coolant supply means at hose 36. The valve means is disengaged from the ring bore wall 28 and retracted from the outer peripheral surface 22 of the ring 18 when coolant is not being supplied by the coolant supply means.

In the preferred embodiment the supply member 32 includes a mounting block 60. Although not necessary, block 60 can be coupled to the cutting tool 2 as, for example, by means of bolts 62, only one of which is shown in the drawings. An elongated cylindrical pipe holder 64 is coupled to the mounting block, pipe holder 64 extending through a cylindrical opening 66 and being held in place by a pipe lock 68 and locking screw 70. Pipe holder 64 extends along a first longitudinal axis 72 which is substantially parallel to the axis of rotation 6 when the mounting block 60 is coupled to the cutting tool 2 as shown. An elongated cylindrical supply pipe 74 is also provided. Supply pipe 74 is slideably coupled to the pipe holder, supply pipe 74 extending through a cylindrical opening 76 in the pipe holder 64 and being held in place by a pipe lock 78 and locking screw 80. Loosening of screw 80 allows the supply pipe 74 to slide along a second longitudinal axis 82 towards and away from the outer peripheral surface 22 of ring 18 to the extent desired to control the spacing in the direction identified by arrow 84 between surface 22 and supply outlet 38. When the pipe holder 64 and supply pipe 74 are mounted to the cutting tool 2, axis 82 coincides with axis 48. In the embodiment depicted in the drawings, the supply pipe 74 includes the supply inlet 34 at one end, the supply outlet 38 at the other end, and the supply bore 40 defined by supply bore wall 42 extending from inlet 34 to outlet 38. Preferably, pipe holder 64 is moveably coupled to the mounting block 60 so that loosening of screw 70 allows the pipe holder to slide, for example, along axis 72 to the extent desired to control the location, in the direction, for example, identified by arrow 86, of the supply outlet 38 along surface 22.

In operation, supply ring 18 is mounted upon tool shank 10 forming a tight fit as described herein. In mounting the supply ring 18, locking rings 88 hold the supply ring 18 in place so that bore 26 is aligned with radial bore 27 of tool shank 10, the bore 27 merging with the axially oriented bore 12 of the tool shank. Seals 90 are provided to prevent leakage at the tool shank-supply ring interface, the dimensions of this interface being exaggerated in the drawings so that the detail discussed herein can be adequately described. An opening 92 extends about the periphery 20 of the ring 18 in a known manner. The details of the foregoing are limited to FIG. 3 so as not to complicate the other drawing Figures. The coolant supply apparatus 32 has either already been adjusted as described herein, or is subsequently adjusted after the supply ring 18 is properly in place. When the apparatus is ready for operation, the tool shank 10 and ring coupled thereto are rotated in the absence of any engagement between ring 18 and coolant supply apparatus 32 until connector 24 engages outlet 38 at which point the tool shank continues to rotate so that the cutting operation is effected, and the ring comes to rest as best seen in FIG. 2. During the cutting operation, coolant flows in the direction of the arrows designated 94. In other words, the coolant flows from hose 36, through bores 40 and 26, around opening 92, through one or more bores 27 and through bore 12 to the cutting members 8. During the flow of coolant in the direction indicated by arrows 94 from an upstream location to a downstream location, the force exerted by the flow of the coolant causes the flexible closures 54 to be flexed to extend axially into ring bore 26 so as to engage the ring bore wall 28 as shown in phantom lines in FIGS. 2 and 3 to prevent leakage from the space between end 38 and ring 18.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A coolant supply apparatus for a cutting tool for cutting a workpiece wherein there is relative cutting motion about an axis of rotation between a cutting member mounted upon a tool shank having a tool bore, and a workpiece, and wherein coolant is supplied from a coolant supply means through a ring bore defined by a ring bore wall which extends from an outer peripheral surface, to an inner peripheral surface, of a coolant supply ring rotatably mounted upon said tool shank, and through said tool bore to said cutting member, comprising:
   (a) a coolant supply member for coupling to said cutting tool and having a supply inlet for coupling to said coolant supply means, a supply outlet, and a supply bore defined by a supply bore wall extending from said supply inlet to said supply outlet and having a supply axis, said supply outlet being spaced from said outer peripheral surface of said ring when said coolant supply member is coupled to said cutting tool; and,
   (b) valve means coupled to said supply member adjacent said supply outlet for substantially preventing leakage between said supply bore and said ring bore when said supply member is coupled to said cutting tool and said supply and ring bores are aligned and coolant is being supplied by said coolant supply means, said valve means being flexible so that said valve means is caused to extend towards said outer peripheral surface of said ring and engage said ring bore wall when said supply member is coupled to said cutting tool and said ring is rotated to align said ring bore with said supply bore and coolant is supplied by said coolant supply means, and so that said valve means is disengaged from said ring bore wall and retracted from said outer peripheral surface of said ring when said coolant is not being supplied by said coolant supply means.

2. The coolant supply apparatus of claim 1 wherein said valve comprises a generally cup shaped member attached to said supply member and having an axis extending in a longitudinal direction and coinciding with said supply axis, said valve including an open end upstream of said supply bore and a normally closed end downstream of said supply bore, said normally closed end including at least one flexible closure which relative to said axis of said cup shaped member normally extends radially and can be flexed to extend axially into said ring bore to engage said ring bore wall when said coolant supply member is coupled to said cutting tool, said supply bore and said ring bore are in alignment, and coolant is being supplied by said coolant supply means.

3. The coolant supply apparatus of claim 2 wherein said flexible closure comprises a plurality of flexible sections.

4. The coolant supply apparatus of claim 3 wherein said flexible closures are wedge shaped.

5. The coolant supply apparatus of claim 4 wherein said cup shaped member includes a flange adjacent said open end and extending radially outward, relative to said axis of said cup shaped member, and into a groove extending circumferentially about said supply bore wall adjacent said supply outlet.

6. The coolant supply apparatus of claim 1 wherein said supply member includes a mounting block for coupling relative to said cutting tool, a pipe holder coupled to said mounting block and extending along a first longitudinal axis when said mounting block is coupled relative to said cutting tool, and a supply pipe slideably coupled to said pipe holder for sliding along a second longitudinal axis towards and away from said outer peripheral surface of said ring when said mounting block is coupled relative to said cutting tool, said supply pipe including said supply inlet at one end, said supply outlet at the other end and said supply bore defined by said supply bore wall extending from said supply inlet to said supply outlet.

7. The coolant supply apparatus of claim 6 wherein said pipe holder is moveably coupled to said mounting block for sliding along said first longitudinal axis.

8. The coolant supply apparatus of claim 7 wherein said valve comprises a generally cup shaped member attached to said supply member and having an axis extending in a longitudinal direction and coinciding with said supply axis, said valve including an open end upstream of said supply bore and a normally closed end downstream of said supply bore, said normally closed end including at least one flexible closure which relative to said axis of said cup shaped member normally entends radially and can be flexed to extend axially into said ring bore to engage said ring bore wall when said coolant supply member is coupled to said cutting tool, said supply bore and said ring bore are in alignment, and coolant is being supplied by said coolant supply means.

9. The coolant supply apparatus of claim 8 wherein said flexible closure comprises a plurality of flexible sections.

10. The coolant supply apparatus of claim 9 wherein said flexible closures are wedge shaped.

11. The coolant supply apparatus of claim 10 wherein said cup shaped member includes a flange adjacent said open end and extending radially outward, relative to said axis of said cup shaped member, and into a groove extending circumferentially about said supply bore wall adjacent said supply outlet.

12. In a cutting tool for cutting a workpiece wherein there is relative cutting motion about an axis of rotation between a cutting member mounted upon a tool shank having a tool bore, and a workpiece, and wherein coolant is supplied from a coolant supply means through a ring bore defined by a ring bore wall which extends from an outer peripheral surface, to an inner peripheral surface, of a coolant supply ring rotatably mounted upon said tool shank, and through said tool bore to said cutting member, the improvement comprising:
(a) a coolant supply member coupled to said cutting tool and having a supply inlet coupled to said coolant supply means, a supply outlet, and a supply bore defined by a supply bore wall extending from said supply inlet to said supply outlet and having a supply axis, said supply outlet being spaced from said outer peripheral surface of said ring; and,
(b) valve means coupled to said supply member adjacent said supply outlet for substantially preventing leakage between said supply bore and said ring bore when said supply and ring bores are aligned and coolant is being supplied by said coolant supply means, said valve means being flexible so that said valve means is caused to extend towards said outer peripheral surface of said ring and engage said ring bore wall when said ring is rotated to align said ring bore with said supply bore and coolant is supplied by said coolant supply means, and so that said valve means is disengaged from said ring bore wall and retracted from said outer peripheral surface of said ring when said coolant is not being supplied by said coolant supply means.

13. The coolant supply apparatus of claim 12 wherein said flexible closure comprises a plurality of flexible sections.

14. The coolant supply apparatus of claim 13 wherein said flexible closures are wedge shaped.

15. The coolant supply apparatus of claim 14 wherein said cup shaped member includes a flange adjacent said open end and extending radially outward, relative to said axis of said cup shaped member, and into a groove extending circumferentially about said supply bore wall adjacent said supply outlet.

16. The coolant supply apparatus of claim 15 wherein said supply member includes a mounting block coupled to said cutting tool, a pipe holder coupled to said mounting block and extending along a first longitudinal axis substantially parallel to said axis of rotation, and a supply pipe slideably coupled to said pipe holder for sliding along a second longitudinal axis towards and away from said outer peripheral surface of said ring, said supply pipe including said supply inlet at one end, said supply outlet at the other end, and said supply bore defined by said supply bore wall extending from said supply inlet to said supply outlet.

17. The coolant supply apparatus of claim 16 wherein said pipe holder is moveably coupled to said mounting block for sliding along said first longitudinal axis.

18. The coolant supply apparatus of claim 12 wherein said valve comprises a generally cup shaped member attached to said supply member and having an axis extending in a longitudinal direction and coinciding with said supply axis, said valve including an open end upstream of said supply bore and a normally closed end downstream of said supply bore, said normally closed end including at least one flexible closure which relative to said axis of said cup shaped member normally entends radially and can be flexed to extend axially into said ring bore to engage said ring bore wall when said supply bore and said ring bore are in alignment, and coolant is being supplied by said coolant supply means.

19. The coolant supply apparatus of claim 18 wherein said flexible closure comprises a plurality of flexible sections.

20. The coolant supply apparatus of claim 19 wherein said flexible closures are wedge shaped.

21. The coolant supply apparatus of claim 20 wherein said cup shaped member includes a flange adjacent said open end and extending radially outward, relative to said axis of said cup shaped member, and into a groove extending circumferentially about said supply bore wall adjacent said supply outlet.

* * * * *